METHOD OF MANUFACTURING A MAGNETIC HEAD STRUCTURE

Filed April 3, 1967

2 Sheets-Sheet 1

INVENTORS
ROBERT L. PERKINS
BEAT G. KEEL

BY Cushman, Darby & Cushman
ATTORNEYS

INVENTORS
ROBERT L. PERKINS
BEAT G. KEEL

BY Cushman, Darby & Cushman
ATTORNEYS 3,514,851

METHOD OF MANUFACTURING A MAGNETIC HEAD STRUCTURE

Robert L. Perkins, St. Paul, and Beat G. Keel, Prior Lake, Minn., assignors to Control Data Corporation, Minneapolis, Minn., a corporation of Minnesota Filed Apr. 3, 1967, Ser. No. 627,763
Int. Cl. H01f 7/06
U.S. Cl. 29—603 3 Claims

ABSTRACT OF THE DISCLOSURE

The present invention is concerned with a method of manufacturing a magnetic head structure in which the read/write and erase gaps associated with a single head are aligned and the head is precisely spaced from an adjacent head. This is accomplished by subjecting a basic head assembly to an erosion process through a template which accurately dictates the dimensional characteristics of the resultant head construction.

The invention relates to a method of manufacturing a magnetic head structure which is used to read, write and erase information on a recording medium, such as a magnetic tape or disc.

The design of a magnetic head structure requires that one or more magnetic paths be provided, each forming a closed magnetic loop except for a narrow gap where the magnetic flux is required to traverse a non-magnetic medium such as air. By placing this gap near the recording medium, the magnetic orientation of the recording material is controllable by regulating the magnetic flux in the head. Conversely, when the magnetic head is passed over a prerecorded medium, the magnetic variation on the medium is sensed by the head, enabling the information to be read by the equipment associated with the head. A magnetic head with a single gap may be used for both writing and reading, especially if the equipment is designed to provide proper alignment so that the head is always oriented over the same narrow track on the recorded surface. This condition is easily met when the heads are fixed relative to the surface such as usually is the case with magnetic drums, but when a requirement exists for relative lateral movement between the head and the recorded track, it is difficult to insure that a head is precisely located over the same track surface each time it is moved into position. Misalignment in positioning a reading head over a prerecorded track results in attenuation of the signal received from the recorded track. In addition, misalignment of a writing head over a prerecorded track surface results in incomplete erasure of the old information as the new information is written. Because of these problems, magnetic heads are designed to erase a path which is wider than the track that is being recorded to insure that all extraneous previous magnetization is removed and will not attenuate or otherwise interfere with the subsequent reading of the newly recorded information. This erasing feature is usually incorporated into the same package as the read/write magnetic head, and may be designed to erase a path on the recording surface immediately ahead of the read/write gap or may be designed to erase a path along both edges of the recording surface immediately behind the read/write gap.

Magnetic heads of the types just described are frequently constructed by building up layers of magnetic laminations to form the desired geometry. A disadvantage of this method is that it requires close mechanical tolerance control in order to insure that each of the laminations fit properly to make the finished producet. Because of the relatively small size of the magnetic head, it is difficult to control these tolerances, and this difficulty usually forces a compromise between quality and cost considerations.

The present invention achieves the advantages of a finished magnetic head structure having precisely aligned read/write and erase gaps and exact spacing between adjacent heads. These advantages are obtained without requiring that each of the manufacturing steps leading up to the final product be controlled to the same or closer tolerances than exist in the final product. The invention permits a high quality structure to be produced at relatively low cost as compared to those structures fabricated by prior art methods.

In carrying out the invention, the stucture in the illustrative embodiments comprises magnetic elements utilizing three blocks of magnetic material for each head. The blocks are arranged in relatively noncritical alignment and are eroded by sandblasting, or some other type of erosion process, to form a head-gap pattern which has very close tolerances. The erosion is performed by overlapping the blocks with a mask in which the desired pattern is formed. This mask pattern is provided not only with a precisely dimensioned outline for a single head-gap pattern, but also with accurate spacing dimensions of the head-gap patterns of adjacent heads.

The specific details and entire scope of the invention will become more fully apparent when considered in light of the following detailed description of illustrative embodiments of the invention and from the appended claims.

The illustrative embodiments may be best understood by reference to the accompanying drawings, wherein.

Figure 1:
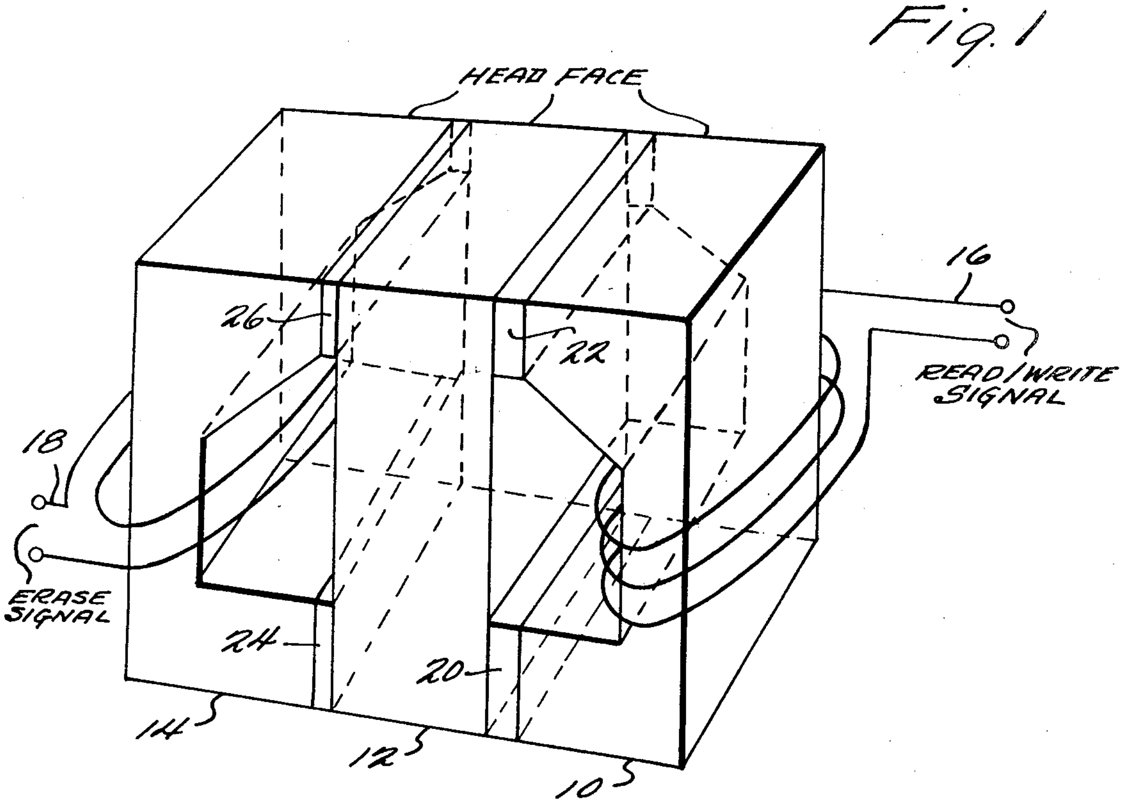
FIG. 1 is an isometric view of three blocks of magnetic material arranged to form a head having read/write and erase gaps.

Referring first to FIG. 1, a conventional magnetic transducer is illustrated. The arrangement includes magnetic elements comprising three blocks of magnetic material, such as ferrite, arranged in substantial alignment. The blocks are indicated generally as 10, 12, and 14. Blocks 10 and 14 are formed in a generally U-shaped manner so as to receive windings 16 and 18 respectively. Winding 16 is utilized for the read/write signal and winding 18 is for the erase signal. Blocks 10 and 12 are separated by a shim of magnetic material 20, which could merely be an extension of either block, and a shim of non-magnetic material 22. The latter shim precisely defines the read/write head gap. Although a non-magnetic shim is illustrated, it should be appreciated that this shim 22 could be eliminated in favor of an air gap. When a signal is applied to winding 16, a magnetic flux path exists through blocks 10 and 12 and through the magnetic surface of a recording medium (not shown) positioned immediately adjacent the head faces.

Blocks 12 and 14 are separated by a magnetic shim 24, which could merely be an extension of either block, and a non-magnetic shim 26. Shim 26 defines the erase gap, and again, this shim could be eliminated in favor of an air gap. The flux path for the erase operation is similar to that described above, except of course, that flux passage is through blocks 12 and 14.

Figure 2:
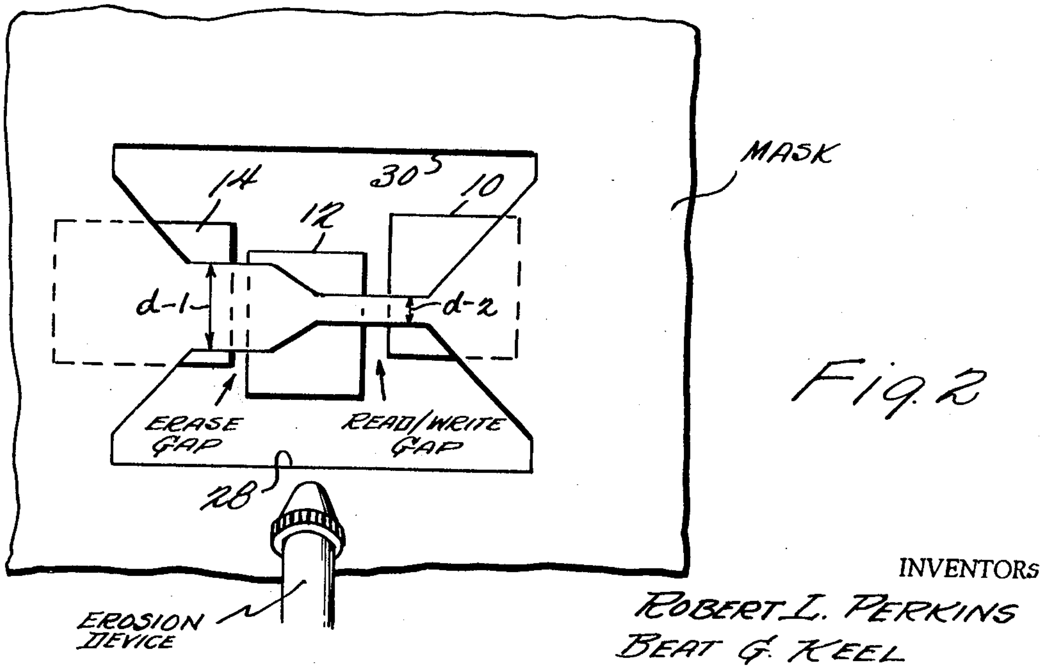
FIG. 2 is a top view of three blocks of magnetic material forming a head with a patterned mask overlapping the head.

In FIG. 2 there is illustrated the arrangement by which precise alignment of the read/write and erase gaps is achieved. For purposes of illustration, the original orientation of the blocks 10, 12 and 14 has been distorted. This is intended to dramatize the utility of the invention in obviating the prior art requirement that the head blocks be in nearly perfect alignment throughout the manufacturing operation. Also to clarify the description, shims 22 and 26 of FIG. 1 have been eliminated, and the read/write and erase gaps have been simply labeled as such. The windings 16 and 18 necessary in a complete transducer are also omitted for convenience of illustration. A suitable mask is laid over the head faces of the magnetic blocks. The mask is provided with cutout portions 28 and 30 to expose selected portions of the head faces. Since the mask can be very accurately fabricated to produce these cutouts, the exposed head portions are precisely defined. The partially masked head is then subjected to an erosion process by which the exposed head surfaces are removed, and the resultant head consists of the raised, non-exposed areas. This method produces a final head structure having aligned and precisely dimensioned read/write and erase gaps. In the illustrative embodiment of FIG. 2, the breadth *d*-1 of the erase gap is appreciably greater than the corresponding dimension *d*-2 of the read/write gap. As pointed out hereinbefore, this permits the head to operate successfully in spite of the alignment difficulties presented in laterally moving the head to a particular record track.

Since the mask can be machined very precisely, a large number of nearly identical head configurations can be produced by the erosion process. As stated previously, this process may utilize a sandblasting technique. However, since it is difficult to maintain a uniform mixture of sand and air, and since the sandblasting must usually be performed in an enclosed room, the utilization of abrasives carried in water or other fluids is also contemplated by the invention. Another method of eroding the material involves the use of an ultrasonic vibrating device which forces abrasive particles on the exposed head faces into the magnetic material thereby eroding same. Although several erosion techniques are described in detail, this should not be considered as exhausting the possibilities for removing the unwanted magnetic material from the head.

Figure 3:
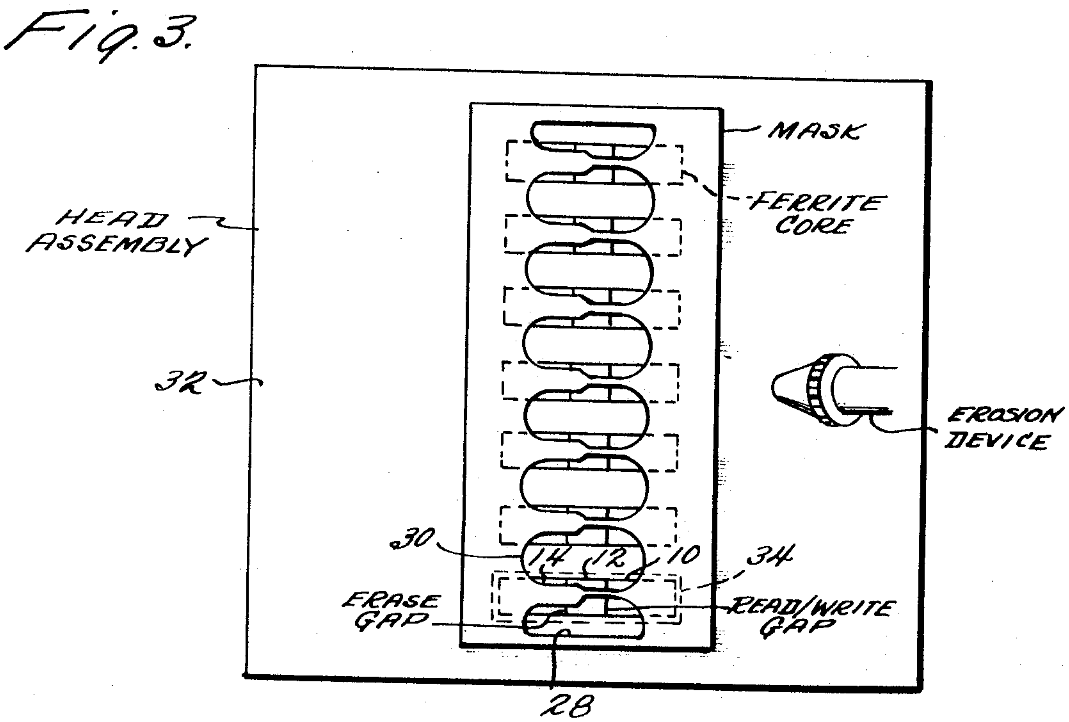
FIG. 3 is a top view of a magnetic head assembly wtih a patterned mask overlapping the assembly.

FIG. 3 illustrates an arrangement by which a multihead structure may be formed utilizing the arrangement described with reference to FIG. 2. Again the windings and the non-metallic shims have been omitted for convenience of illustration. This embodiment includes a holder 32 provided with a plurality of slots 34, only one of which is shown, within which the magnetic elements forming the heads, consisting of blocks 10, 12 and 14, are placed. The blocks are non-magnetically supported within the holder slots 34 by suitable means, as for example, by embedding the blocks in a material such as epoxy. The mask in this construction has a plurality of cutout portions 28, 30 dimensioned not only to insure alignment of the final read/write and erase gaps of the individual heads, but also to precisely space these gaps with respect to those of adjacent heads. By this arrangement, a magnetic head structure can be fabricated to function with a plural track recording medium.

Figure 4:
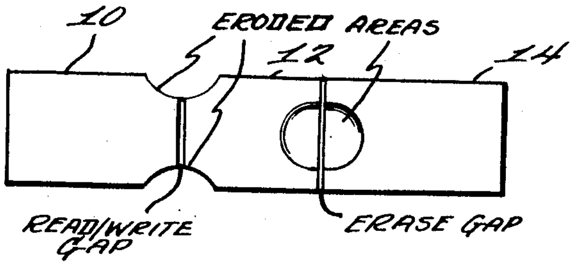
FIG. 4 is a top view of a magnetic head eroded in a different configuration from that which is produced utilizing the masks illustrated in FIGS. 2 and 3.

The arrangements described with reference to FIGS. 2 and 3 are particularly directed to magnetic head structures which have an erase gap which is ahead of the read/write gap with respect to the moving recording medium. However, the invention contemplates the reverse orientation in which the read/write gap is ahead of the erase gap. For example, in FIG. 4 there is illustrated how the use of another mask pattern can lead to a different head design. In this embodiment, the head is eroded so as to provide an erase gap which follows the read/write gap, thereby permitting erasure of old information which may remain along the edges of the newly written track.

The above-described embodiments are illustrative of preferred forms of the invention but are not intended to limit the possibilities of insuring the features of read/write and erase gap alignment and accurate spacing between heads. For example, although the embodiment of FIG. 3 is formed by inserting the magnetic blocks into a single holder, it may also be convenient to place the blocks in separate holders and thereafter join the holders to form a unitary structure. Also, although each magnetic head element is described as being developed from assembled blocks of magnetic material, it should be appreciated that the head could just as well be fabricated from a unitary magnetic element suitably provided with read/write and/or erase gaps formed of a non-magnetic medium. The head structures disclosed herein are examples of arrangements in which the inventive features of this disclosure may be utilized, and it will become apparent to one skilled in the art that certain modifications may be made within the spirit of the invention as defined by the appended claims.

What is claimed is:

1. A method of manufacturing a magnetic head structure, comprising:

(a) supporting at least two elements of magnetic material in spaced relationship, each element being provided with at least one gap formed of a non-magnetic medium;

(b) overlaying said elements with a mask having cutout portions adjacent each gap to expose selected portions of the gap and the magnetic material; and (c) physically eroding the selected portions left exposed by the mask to thereby develop a plurality of precisely dimensioned magnetic heads exactly spaced with respect to one another.

2. A method of manufacturing a magnetic head structure, comprising:

(a) supporting an element of magnetic material provided with a pair of gaps formed of a non-magnetic medium;

(b) overlaying said element with a mask having at least one cutout portion adjacent each gap to expose aligned selected portions of the gaps and the magnetic material; and (c) physically eroding the selected portions left exposed by the mask to thereby develop a magnetic head having precisely aligned and dimensioned gaps.

3. A method of manufacturing a magnetic head structure comprising:

(a) non-magnetically supporting at least two elements of magnetic material in spaced relationship, each element being provided with a pair of gaps formed of a non-magnetic medium;

(b) overlaying said elements with a mask having cutout portions adjacent each gap to expose selected portions of the gap and the magnetic material; and (c) physically eroding the selected portions left exposed by the mask to thereby develop a plurality of precisely dimensioned magnetic heads exactly spaced with respect to one another.

References Cited

UNITED STATES PATENTS

| | | | |
|---|---|---|---|
| 1,882,526 | 10/1932 | Smith | 51—310 X |
| 2,787,854 | 4/1957 | Simjian | 51—310 |
| 3,106,617 | 10/1963 | Fox | 179—100.2 |
| 3,244,818 | 4/1966 | Bick et al. | 179—100.2 |
| 3,247,572 | 4/1966 | Munk | 51—310 X |
| 3,353,261 | 11/1967 | Bradford et al. | 29—603 |

JOHN E. CAMPBELL, Primary Examiner

C. E. HALL, Assistant Examiner

U.S. Cl. X.R.

51—310, 319; 179—100.2